Jan. 8, 1963 F. W. OLSEN 3,072,547

PATTERN FORMING METHOD AND APPARATUS

Filed July 11, 1960 5 Sheets-Sheet 1

INVENTOR
FLOYD W. OLSEN

BY Donald F Voss

ATTORNEY

Jan. 8, 1963 F. W. OLSEN 3,072,547

PATTERN FORMING METHOD AND APPARATUS

Filed July 11, 1960 5 Sheets-Sheet 5

United States Patent Office 3,072,547

Patented Jan. 8, 1963

3,072,547

PATTERN FORMING METHOD AND APPARATUS

Floyd W. Olsen, Athens, Pa., assignor to International Business Machines Corporation, New York, N.Y., a corporation of New York Filed July 11, 1960, Ser. No. 42,029
8 Claims. (Cl. 204—143)

This invention relates to apparatus for forming patterns by exposing a photoresist adherent to a rotatable member, particularly to apparatus for forming upon a rotatable surface patterns representing timing tracks and, more particularly, to apparatus for forming a permanently recorded pattern of timing tracks upon the surface of the magnetic drum or disc where the timing tracks so formed may be sensed electromagnetically.

In machines utilizing timing discs or drums containing permanently recorded marks which may be sensed electromagnetically, it has been the practice to employ a dividing machine to form the pattern of the marks in a protective coating applied to the surface of the disc or drum. With the pattern so formed in the protective coating, the disc or drum is then subjected to an etching or electroplating bath whereby the marks become permanently formed upon the surface of the disc or drum. The outer surface of the drum or disc is generally a layer of magnetizable material covering a layer of non-magnetic material. If the unprotected areas of the magnetizable layer are removed by etching or reverse electroplating to expose the non-magnetic layer, then a suitable magnetic head may sense these discrete non-magnetic surface areas. Of course, non-magnetic material could be plated in discrete areas on top of the magnetizable layer.

The use of a dividing machine to form the pattern by scribing marks in an etching or plating resist is relatively expensive and the process is rather tedious. Further, and more importantly, the accuracy of the location of the scribed marks relative to a home position is somewhat limited. In the present invention, the surface area of the drum or disc which is to carry the timing track is coated with a photoresist. The timing track which is to be permanently recorded upon the surface of the drum or disc is recorded thereon in another area magnetically. Of course, the timing track could be magnetically recorded upon a master drum or disc. The techniques for magnetically recording timing tracks upon magnetic surfaces are well known. The magnetically recorded timing track is then read by a magnetic head or several magnetic heads which are commoned together. The output signal from the magnetic head or several magnetic heads is transmitted to an appropriate amplifier having its output connected to pulse an arc lamp, such as a xenon arc lamp. The lightwaves emitted from the impulsed arc lamp are collected or focused by means of a lens and beamed through an opaque member having a non-opaque area or slit, or series of spaced slits, to expose the photoresist coating upon the surface of the drum or disc to reproduce the magnetically recorded timing track. Hence, a pattern recorded magnetically upon the drum or disc is reproduced in the form of an exposed photoresist, which may be further processed in the usual manner to permit etching or electroplating. As it will be pointed out later herein, either a positive or negative pattern may be recorded magnetically upon the surface of the drum or disc depending upon the type of photoresist utilized. Also, as it will be seen later herein, several techniques have been developed for improving the quality of the reproduced pattern.

Accordingly, it is a prime object of the invention to provide apparatus which enables the forming of a permanent pattern upon a magnetizable moving surface.

A more specific object of the invention is to provide apparatus for forming a permanent pattern upon a surface where the pattern is a reproduction of another pattern recorded in the form of magnetized spots.

Still a more specific obect of the invention is to provide apparatus which enables the forming of a permanent pattern upon a magnetizable moving surface in a very accurate manner.

Another object of the invention is to provide apparatus which enables the forming of a permanent pattern upon a magnetizable moving surface in a relatively inexpensive manner.

The foregoing and other obects, features and advantages of the invention will be apparent from the following more particular description of preferred embodiments of the invention, as illustrated in the accompanying drawings.

FIGS. 10 to 15, inclusive, schematically illustrate the steps involved in the method for forming a permanently recorded pattern of timing tracks upon the surface of a magnetic drum.

Figure 1:
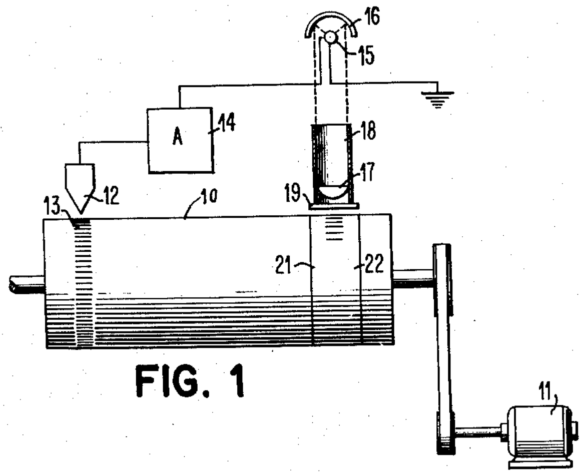
FIG. 1 is a schematic representation of the apparatus embodying the invention.
Figure 2:
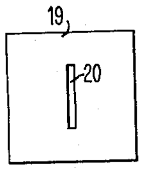
FIG. 2 is a detail view of an opaque member provided with a non-opaque area or slit.

Referring to the drawings and particularly to FIG. 1, the invention is illustrated by way of example as apparatus for forming a permanently recorded pattern of timing tracks upon the surfaces of magnetic drum 10. The magnetic drum 10 is suitably journalled to be rotated at a desired speed by any suitable driving source, such as motor 11. A magnetic head 12 is disposed to read a prerecorded timing track 13 in the form of magnetized spots. The timing track 13 may be recorded by any suitable means well known in the art, such as by the use of an oscillator and various gating circuits. The output of the magnetic head 12 is connected as an input to an amplifier 14 having its output connected to an arc lamp 15 adapted to be operated by electrical impulses. The lightwaves emitted from the arc lamp are reflected by means of a suitable reflector 16 and collected by means of a lens 17. Lightwaves collected or focused by the lens 17 are directed to an opaque lens housing or tube 18 to an opaque member 19 having a rectangular narrow aperture 20, as seen in FIG. 2. The lens 17, in fact, can be situated at the one end of the housing 18. The aperture 20 controls both the length and width of the area to be exposed upon the surface of the drum 10 at any one impulse from the arc lamp 15. The distance of the member 19 from the drum surface 10 is very small and is shown in an exaggerated manner in FIG. 1. The entire drum surface area is coated with a photoresist and the surface area for containing the permanently recorded timing marks is indicated in FIG. 1 between the lines 21 and 22.

The arc lamp 15 may be any suitable arc lamp, such as a xenon arc lamp. This type of arc lamp emits ultraviolet rays at very high intensity. Accordingly, the apparatus schematically illustrated in FIG. 1 is contained in a suitable enclosure, not shown. By this arrangement, as the drum 10 is rotated, the magnetic head 12 reads the magnetized spots representing the timing track 13. As the magnetic head 12 reads the magnetized spots, a signal is developed which is amplified by the amplifier 14; and the amplified signal is transmitted to impulse the arc lamp 15. In response to being impulsed, the arc lamp 15 emits lightwaves which are reflected by reflector 16 and focused by lens 17. The focused lightwaves are conducted through the housing 18 to the member 19. The lightwaves pass through the aperture 20 in member 19 to expose a narrow section of the photoresist applied to the surface of the drum 10 between the lines 21 and 22.

Figure 3:
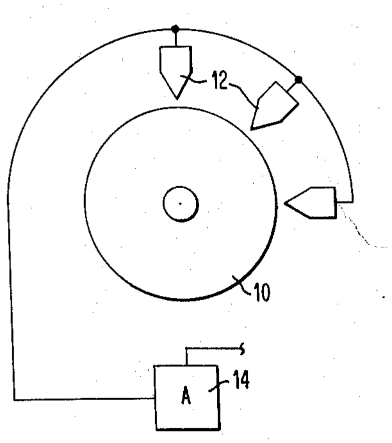
FIG. 3 is a schematic representation wherein more than one magnetic head is utilized to read the signals recorded upon the drum.
Figure 8:
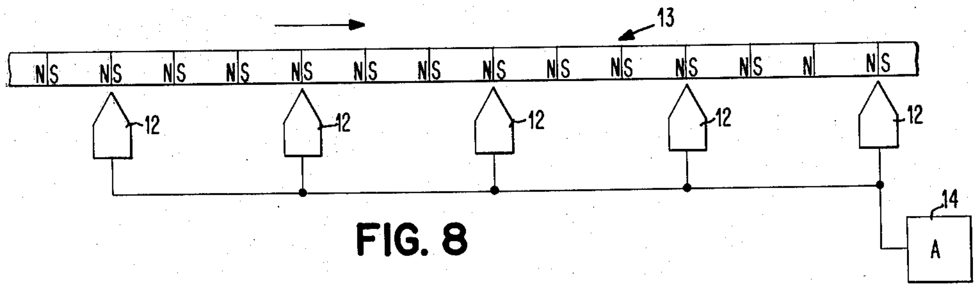
FIG. 8 is a developed view schematically representing the magnetic reading heads in relation to the magnetic timing track disposed upon the magnetic drum.

In order to improve the accuracy of the timing track and to reduce operating costs, several magnetic heads 12, as shown in FIGS. 3 and 8, are positioned to simultaneously read a magnetic spot of the timing track 13. The output of the magnetic heads 12 are commonly connected, and the common connection is connected as an input to amplifier 14. The feature of utilizing several magnetic heads to read the same timing track results in an improved signal-to-noise ratio, a compressed signal on linear bit size, and greatly reduced runout.

Figure 4:
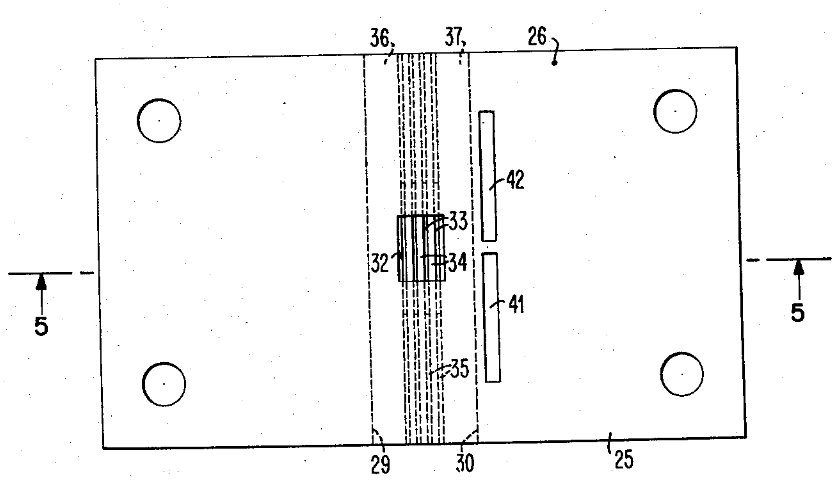
FIG. 4 is a plan view of the opaque member provided with several non-opaque areas.
Figure 5:
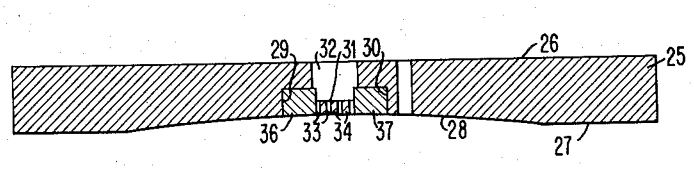
FIG. 5 is a sectional view taken along the line 5—5 in FIG. 4.
Figure 7:
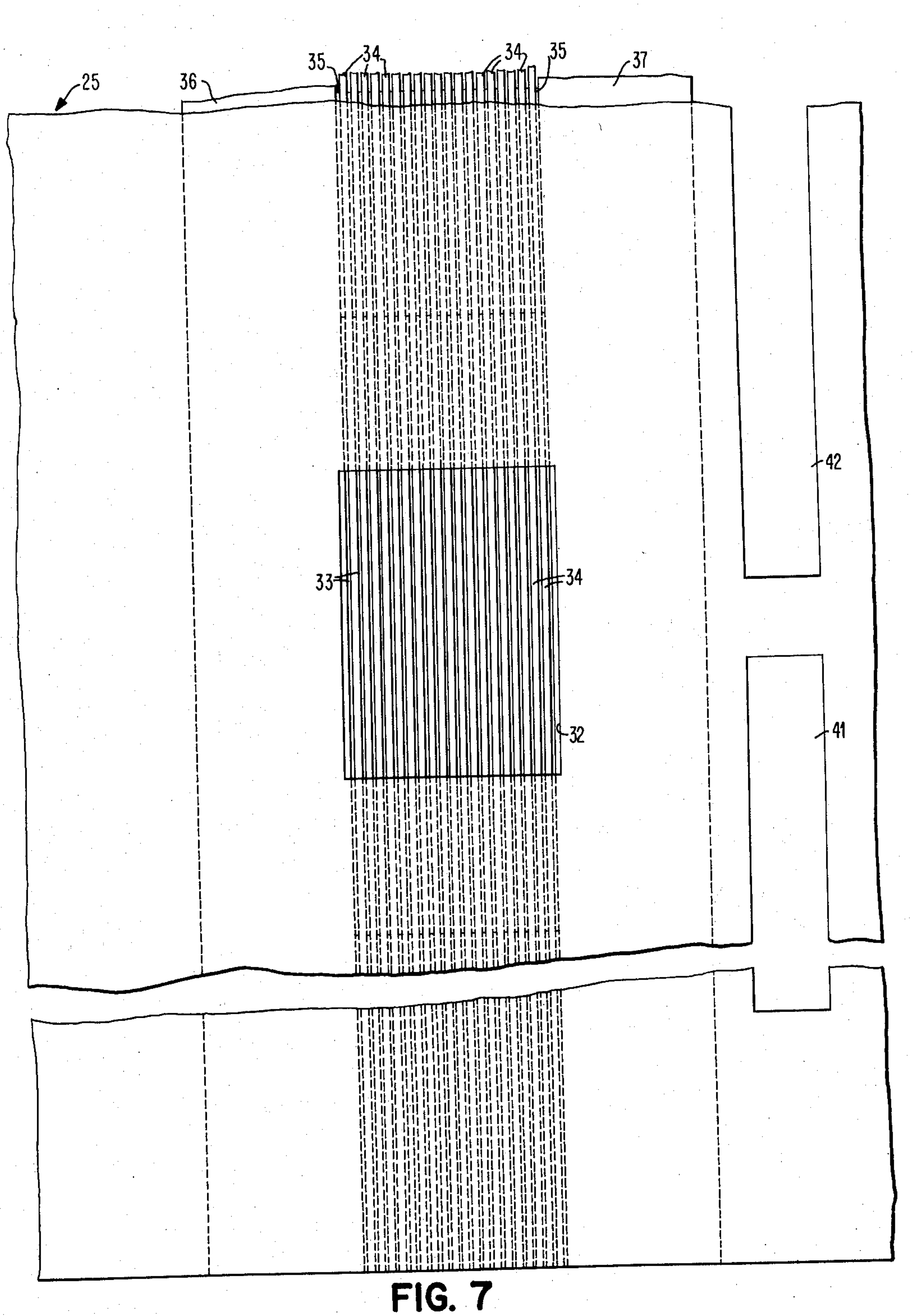
FIG. 7 is an enlarged plan view of the opaque member having the non-opaque areas or slits.

In order to reduce exposure time, improve linear accuracy, and to improve the exposure characteristic of the photoresist, the member 19 may be in the form of a grid plate 25, as shown in FIGS. 4, 5 and 7. In this example, the grid plate 25 enables twenty spaced areas to be exposed simultaneously. For purposes of clarity, twenty longitudinal apertures are shown in FIG. 7 while only four are shown in FIGS. 4 and 5.

The grid plate 25 is a rectangular plate having an upper surface 26 and a lower surface 27. The surface 27 is adapted to be in juxtaposition with the surface of the drum 10. To facilitate this arrangement, the surface 27 is provided with a shallow arcuate groove 28 conforming to the arcuate surface of the drum 10. The grid plate 25 has two laterally extending longitudinally spaced slots 29 and 30. The slots 29 and 30 are formed so as to leave a central rib 31 therebetween. The rib 31 has a central rectangular aperture 32 extending therethrough, as seen in FIGS. 4 and 5. The aperture 32 is divided into several narrow longitudinally spaced rectangular apertures 33 by means of grid bars 34. The grid bars 34 are maintained in the longitudinally spaced relationship by spacers 35 resting upon rib 31. Shims 36 and 37 are disposed in grooves 29 and 30 to very accurately locate spacers 35 and grid bars 34.

Figure 6:
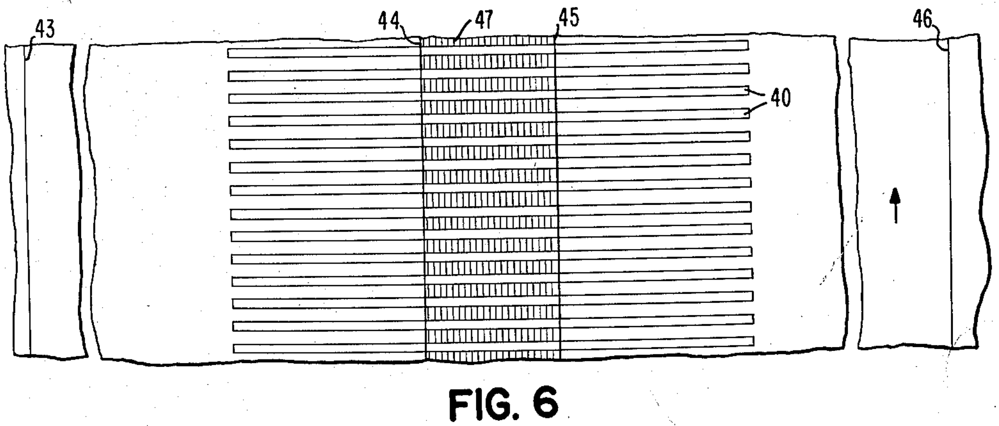
FIG. 6 is a developed view of the magnetic drum surface showing the exposed and unexposed areas thereon.

The apertures 33 expose areas of the drum surface coated with photoresist, as seen in FIG. 6. The exposed areas, as seen in FIG. 6, are outlined by the narrow rectangles 40. In this example, the apertures 33 will expose or form a negative pattern in the photoresist applied to the surface of the drum. Hence, the distance between the rectangles 40, shown in FIG. 6, that being the unexposed area of the photoresist, represents the reproduction of the timing track 13. Of course, depending upon the type of photoresist utilized, the areas exposed are the apertures 33, could be a positive representation of the timing tracks 13.

In order to provide a sharply defined unexposed area, edge defining apertures 41 and 42 are formed in the grid plate 25. The edge defining apertures 41 and 42 are relatively wide compared to apertures 33. Hence, as the arc lamp 15 is impulsed in response to signals being generated as the magnetic spots of the timing track upon the drum 10 are read by the magnetic heads, the area of the drum surface disposed beneath the edge defining apertures 41 and 42 is continuously exposed, as seen in FIG. 6. The drum surface area covered by photoresist exposed by aperture 41 is contained between the lines 43 and 44, while the area exposed by the aperture 42 is contained between lines 45 and 46. By this arrangement, the unexposed areas of the photoresist are represented by the vertical shaded areas 47. Hence, the length and width of the unexposed spaced areas 47 are very well defined.

Figure 9:
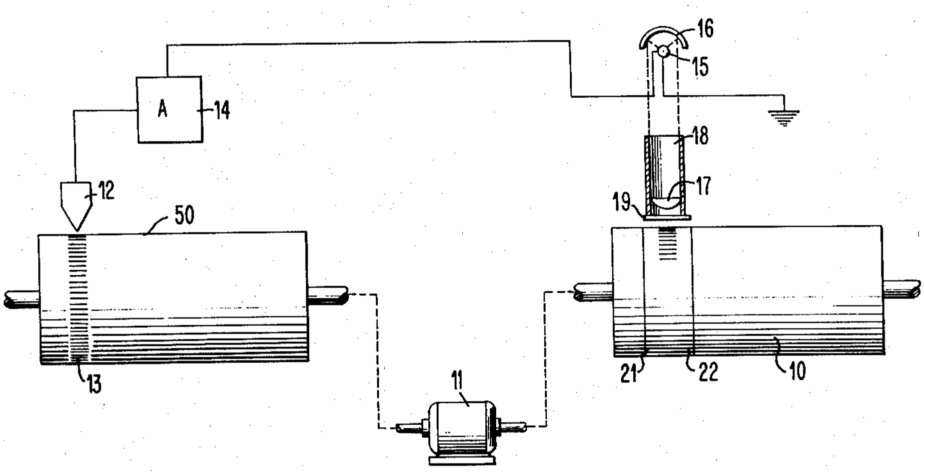
FIG. 9 is a schematic representation of an alternate embodiment of the invention.

The magnetically recorded timing track 13 may be contained upon another drum 50 rotated in synchronism with drum 10 by motor 11. For production runs, the master drum containing the timing track 13 would be utilized, as seen in FIG. 9.

Figure 10:
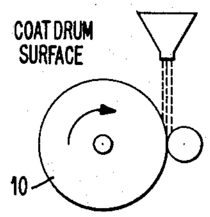

The method for forming a permanently recorded pattern of timing tracks upon the surface of the magnetic drum 10, where the timing tracks so formed may be sensed electromagnetically, is illustrated in FIGS. 10 to 15, inclusive. Assuming that the master drum 50 will be utilized and the master drum 50 contains a prerecorded timing track 13, the first step is to coat the surface of the drum 10 with a photoresist, as seen in FIG. 10. In this example, a Kodak photoresist is applied to the surface of the drum 10 by rotating the drum 10 at a speed between 10 to 20 r.p.m. and permitting the photoresist to flow onto the drum surface. A glass rod is disposed tangentially to the drum surface to spread the photoresist.

Figure 11:
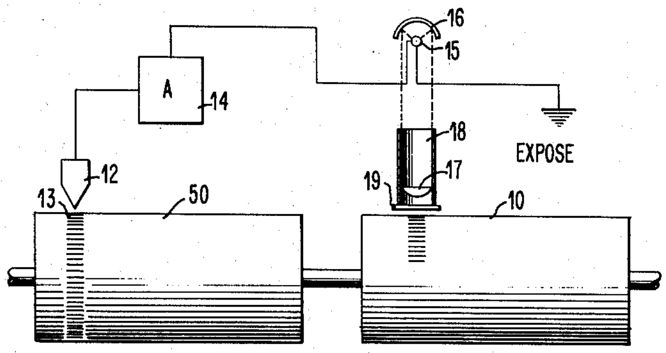

The next step is to mount the drums 10 and 50 as shown in FIG. 11. The magnetic read heads 12 should be calibrated to read the magnetic spots forming a timing track 13 at the desired speed. Generally speaking, the magnetic signal developed by the read heads 12 is better when the drums are rotated at a higher frequency. However, exposure of the photoresist is better at a lower frequency. These factors may be balanced to achieve the best results. Normally, the magnetic spots forming the timing track 13 are recorded upon the surface of the drum 10 at full drum speed. Hence, with the drum 10 rotating at a slower speed so as to improve the exposure of the photoresist applied to the surface of the drum 10, the magnetic heads 12 should be calibrated to read at the lower speed. The next step is to rotate the drums 10 and 50 in synchronism so that the magnetic read heads 12 read the magnetized spots forming the timing track 13, thereby developing an electrical signal to impulse the arc lamp 15 and thus expose a discrete surface area of the drum 10. The signals developed by the magnetic read heads 12 are transmitted to the amplifier 14 which amplifies the same and passes the signals in amplified form to the arc lamp 15. The arc lamp 15 then emits lightwaves in response to the electrical impulses received from the amplifier 14, thereby exposing the surface of the drum 10.

Figure 12:
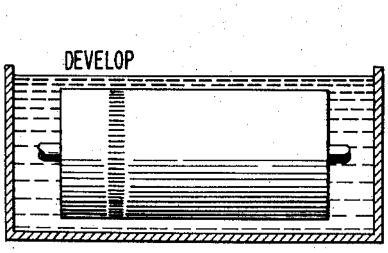
Figure 13:
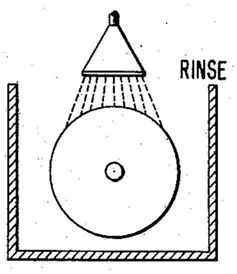

The next step is to develop the photoresist as shown in FIG. 12. The photoresist is developed by immersing the drum 10 in a tank containing a suitable developing solution. After developing the photoresist, the unexposed areas are washed away during a rinsing operation, shown in FIG. 13, thereby leaving the remaining portions of the drum protected by a coating.

Figure 14:
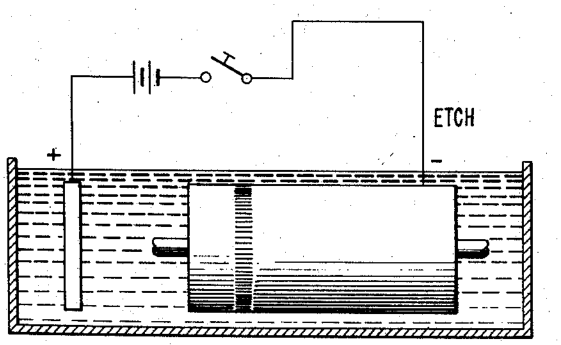
Figure 15:
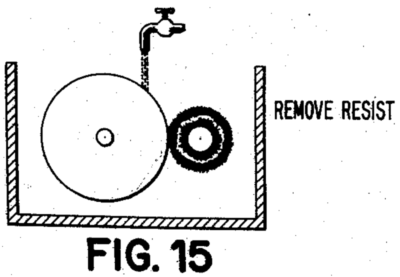

The unprotected areas of the drum are then etched away by a reverse electroplating process, shown in FIG. 14. This is accomplished by placing the drum 10 in a tank containing a suitable electrolyte such as a salt solution. The drum is connected to a negative potential while an anode of nickel-cobalt also immersed in the electrolyte is connected to a positive potential. During the reverse plating process, the unprotected areas of the magnetizable surface are removed, thereby leaving a series of spaced non-magnetic areas. After etching by the reverse plating process, the protective coating is removed from the drum surface by brushing the coating with any suitable solvent, as shown in FIG. 15. The drum 10 now has a permanently recorded timing track.

From the above, it is seen that the invention provides the recording of a permanent pattern upon a magnetizable surface adapted to be rotated. Further, it is seen that the pattern is a reproduction of another pattern recorded in the form of magnetized spots. Further, the invention provides for the forming of a permanent pattern upon a magnetizable moving surface where the pattern is a very accurate reproduction of another pattern and is formed in a relatively inexpensive manner.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for forming a timing pattern in a light sensitive coating adherent to the surface of a rotatable magnetizable member having a timing pattern thereon in the form of magnetized spots comprising: means for rotating said magnetizable member, a magnetic head disposed to sense said magnetized spots to generate the electrical impulses as said magnetizable member rotates, a lamp adapted to be operated by electrical impulses, an opaque member having a non-opaque area fixedly disposed adjacent said light sensitive coating, means for focusing light impulses generated by said lamp to pass through said non-opaque area to impinge upon said light sensitive coating, and circuit means connecting said magnetic head to said lamp whereby the same generates light impulses in response to being impulsed by the electrical impulses generated by said magnetic head to expose said light sensitive coating in discrete areas to form a pattern therein corresponding to the pattern of said magnetized spots.

2. Apparatus for forming a timing pattern in a light sensitive coating adherent to the surface of a rotatable magnetizable member having a timing pattern thereon in the form of magnetized spots comprising: a plurality of magnetic heads spaced from each other so that said heads simultaneously sense magnetized spots to generate electrical impulses as said magnetizable member rotates, means for rotating said magnetizable member, a lamp adapted to be operated by electrical impulses, an opaque member having a non-opaque area fixedly disposed adjacent said light sensitive coating, means for focusing light impulses generated by said lamp to pass through said non-opaque area to impinge upon said light sensitive coating, and circuit means commonly connecting said magnetic heads to said lamp whereby the same generates light impulses in response to being impulsed by the electrical impulses generated simultaneously by said magnetic heads to expose said light sensitive coating thereby forming a pattern therein corresponding to the pattern of said magnetized spots.

3. Apparatus for forming a timing pattern in a light sensitive coating adherent to the surface of a rotatable magnetizable member having a timing pattern thereon in the form of magnetized spots as in claim 2 wherein said opaque member is provided with a plurality of non-opaque areas spaced from each other to correspond to the spacing of said magnetized spots.

4. Apparatus for forming a timing pattern in a light sensitive coating adherent to the surface of a rotatable magnetizable member having a timing pattern thereon in the form of magnetized spots as in claim 3 wherein said opaque member is provided with a pair of laterally spaced edge defining non-opaque areas having a width so that the light impulses from said lamp continuously expose portions of said light sensitive coating to overlap portions of said light sensitive coating exposed by light impulses passing through said plurality of non-opaque areas thereby leaving a plurality of spaced unexposed portions of light sensitive coating bounded exposed portions.

5. Apparatus for forming a timing pattern in a light sensitive coating adherent to the surface of a rotatable magnetizable member comprising: a master rotatable member having a timing pattern thereon in the form of magnetized spots, means for rotating said magnetizable member in synchronism with said master member, a magnetic head disposed to sense said magnetized spots on said master member to generate electrical impulses as said master member rotates, a lamp adapted to be operated by electrical impulses, an opaque member having a non-opaque area for passing light impulses fixedly disposed adjacent said light sensitive coating, means for focusing light impulses generated by said lamp to pass through said non-opaque area to impinge upon said light sensitive coating, and circuit means connecting said magnetic head to said lamp whereby the same generates light impulses in response to being impulsed by the electrical impulses generated by said magnetic head to expose said light sensitive coating to form a pattern therein corresponding to the pattern of said magnetized spots.

6. A method for forming permanent timing tracks upon a magnetizable surface which comprises: recording a timing track upon said magnetizable surface in the form of magnetized spots; coating said magnetizable surface with a photoresist; reading said magnetized spots to develop a series of electrical impulses; exposing discrete areas of said coated magnetizable surface with light impulses generated by an arc lamp impulsed by the electrical impulses generated during the reading of said magnetized spots, said light impulses being directed onto said coated surface through a timing track defining aperture of a member in juxtaposition with said coated magnetizable surface; developing said exposed coated surface, thereby forming upon said magnetizable surface a protective coating covering discrete surface areas leaving other areas unprotected; and removing the magnetizable surface in the unprotected areas.

7. A method for forming permanent timing tracks upon a magnetizable surface which comprises: coating said magnetizable surface with a photoresist; generating a series of electrical impulses to represent the timing tracks; exposing discrete areas of said coated magnetizable surface with light impulses produced by a lamp impulsed by the electrical impulses representing said timing track, said light impulses being directed onto said coated surface through a timing track defining aperture of a member in juxtaposition with said coated magnetizable surface; developing said exposed coated surface, thereby forming upon said magnetizable surface a protective coating covering discrete surface areas leaving the other areas unprotected; and removing the magnetizable surface in the unprotected areas.

8. A method for forming permanent timing tracks upon a magnetizable surface as in claim 7 wherein said magnetizable surface in the unprotected areas is removed by reverse electroplating.

References Cited in the file of this patent

UNITED STATES PATENTS

| | | |
|---|---|---|
| 2,115,198 | Eggert et al. | Apr. 26, 1938 |
| 2,294,643 | Wurzburg | Sept. 1, 1942 |
| 2,784,154 | Korbelak et al. | Mar. 5, 1957 |
| 2,803,809 | Tilley | Aug. 20, 1957 |
| 3,006,238 | Eberline | Oct. 31, 1961 |

FOREIGN PATENTS

| | | |
|---|---|---|
| 103,576 | Australia | Apr. 7, 1938 |